(12) United States Patent
Fasnacht

(10) Patent No.: US 7,121,039 B2
(45) Date of Patent: Oct. 17, 2006

(54) POLYMERIC SPINNERBAIT LURE FRAME

(75) Inventor: Jeffrey Fasnacht, Columbus, IN (US)

(73) Assignee: S&J Manufacturing LLC, Greensburg, IN (US)

( * ) Notice: Subject to any disclaimer, the term of this patent is extended or adjusted under 35 U.S.C. 154(b) by 140 days.

(21) Appl. No.: 10/614,616

(22) Filed: Jul. 7, 2003

(65) Prior Publication Data

US 2005/0005498 A1    Jan. 13, 2005

(51) Int. Cl.
*A01K 85/10*   (2006.01)
*A01K 85/12*   (2006.01)

(52) U.S. Cl. .................... 43/42.13; 43/42.11; 43/42.19

(58) Field of Classification Search ............... 43/42.12, 43/42.13, 42.14, 42.16, 42.19, 42.11, 43.1
See application file for complete search history.

(56) References Cited

U.S. PATENT DOCUMENTS

| | | | | |
|---|---|---|---|---|
| 1,503,400 A | * | 7/1924 | Webb ........................ | 43/42.5 |
| 2,821,044 A | * | 1/1958 | Bateman .................... | 43/42.16 |
| 4,133,134 A | * | 1/1979 | Cheng ....................... | 43/42.06 |
| 4,640,040 A | * | 2/1987 | Smith ......................... | 43/42 |
| 4,640,041 A | | 2/1987 | Stanley | |
| 5,172,510 A | * | 12/1992 | Lovell, Jr. ................. | 43/42.36 |
| 5,253,446 A | * | 10/1993 | Ogle .......................... | 43/42.13 |
| 5,274,946 A | * | 1/1994 | Fusco ........................ | 43/43.2 |
| 5,355,612 A | | 10/1994 | Smith | |
| 5,465,523 A | | 11/1995 | Garst | |
| 5,481,821 A | | 1/1996 | Stanley | |
| 5,605,004 A | | 2/1997 | Boullt et al. | |
| 5,974,723 A | * | 11/1999 | Taibi ......................... | 43/42.13 |
| 6,041,538 A | | 3/2000 | Roemer | |
| 6,164,006 A | | 12/2000 | Peterson | |
| 6,226,917 B1 | * | 5/2001 | Sylla et al. ................ | 43/42.09 |
| 6,266,914 B1 | | 7/2001 | Johnson et al. | |
| 6,601,336 B1 | * | 8/2003 | Link ......................... | 43/42.13 |
| 6,665,977 B1 | * | 12/2003 | Hammond ................. | 43/42.18 |
| 6,763,631 B1 | * | 7/2004 | Santini ...................... | 43/42.36 |
| 6,796,080 B1 | * | 9/2004 | Mathews et al. .......... | 43/42.13 |

* cited by examiner

*Primary Examiner*—Peter M. Poon
*Assistant Examiner*—David J. Parsley
(74) *Attorney, Agent, or Firm*—Jansson, Shupe, Munger & Antaramian, Ltd.

(57) ABSTRACT

An improved spinnerbait lure having a frame with at least one arm formed from an integral length of polymeric material and at least one blade secured to the frame. Preferably, the frame has upper and lower arms where at least the upper arm has particular vibratory properties from an oblong cross-section and the head of a jig is embedded in the lower arm. A transparent polymeric material such as polycarbonate can be used.

9 Claims, 2 Drawing Sheets

POLYMERIC SPINNERBAIT LURE FRAME

FIELD OF THE INVENTION

This invention is related generally to fishing lures and, more particularly, to spinnerbait lures having frames that support and secure elements such as jigs, hooks, and blades.

BACKGROUND OF THE INVENTION

Artificial fishing lures fall within a number of different categories. One particularly popular group of lures are those described as spinnerbait. Spinnerbait lures usually comprise three types: in-line spinners, V-shaped or safety-pin spinners, and buzzbait. Each of these types share the presence of a spinner blade as part of the lure.

The spinner blade can be one of a number of different blades typically made from thin, highly reflective metal. The blade is formed so as to allow it to rotate or spin as the lure is pulled through the water. A spinner blade is typically secured to the lure in a fashion allowing it to spin above, behind or about the lure frame. This rotation serves to attract fish to the lure due to flash generated by reflections of light off the spinner blade and sound brought about by the vibration of the blade in the water. This manner of attracting fish has proven useful in a variety of fishing environments and accounts for the high regard given spinnerbaits by fishermen around the world.

The frame is the foundation on which the spinnerbait lure is built. Frames typically have been made from wire. The selection of wire for the frame is usually based on the wire having certain properties which compliment the overall effectiveness of the lure. Particularly preferred frames in the prior art, for example, use wire that give the frames a resilient flexing quality wherein they return substantially to their original configuration after force-induced distortions. Moreover, the wire used should have high strength and good durability to allow the frame to resist fraying or sustaining abrasions due to contact with rocks and other sharp objects beneath the water or when bitten by the fish themselves with their sharp teeth. Stainless steel is a highly desired metal alloy utilized in making frames since it has acceptable elasticity and tensile strength for these purposes.

Another consideration in the choice of material for the frame is the need that the frame not be a distraction to the fish. To achieve such reduced visibility, every effort is made therefore to form a frame from wire having as small a diameter as possible. The problem this presents, however, is that the thinner the wire, the weaker and less durable the frame.

In many spinnerbait lures, one end of the wire frame is secured to a jig. Jigs are commonly comprised of a metal body or jig-head and a hook. In constructing these lures, the jig is typically formed by a molding process wherein both the end of the frame and the shaft of the hook are embedded together within the metal body. As the frame's diameter is reduced to make it less conspicuous to the fish, however, the likelihood of the jig snapping off of the frame increases. Not only would this make a valued lure worthless, but a number of studies have attributed an increase in lead poisoning of waterfowl to ingestion of lead jig-heads and sinkers lost in the water.

There is a recognized need, therefore, for an improved spinnerbait lure frame made from material that leaves it transparent but without a sacrifice in strength, durability, or flexing resilience (i.e. elasticity). A spinnerbait having a lure that accomplishes this as well as having qualities that enhance the ability of the lure at attracting fish would be even more highly desirable. The present invention addresses these needs and overcomes other shortcomings in the prior art in a simple and inexpensive manner.

OBJECTS OF THE INVENTION

It is a primary object of this invention to provide an improved spinnerbait lure that overcomes some of the problems and shortcomings of the prior art.

Another object of this invention is to provide an improved spinnerbait lure where the frame is formed from an integral length of polymeric material that allows the frame to recover its original configuration after undergoing non-destructive bending.

Another object of this invention is to provide a novel spinnerbait lure having a frame made from polymeric material that allows the frame to be transparent.

Another object of this invention is to provide an exceptional spinnerbait lure where the frame is made from polymeric material that allows the frame to take on color whereby the lure is less conspicuous to fish in the water.

Another object of this invention is to provide an excellent spinnerbait lure having a frame with desirable vibratory properties whereby the lure demonstrates increased action and improved attractiveness to fish in the water.

Another object of the invention is to provide a novel spinnerbait lure where a jig is secured to the lure by embedding the jig-head within the frame so that the lure has increased durability and is environmentally safe.

Another object of the invention is to provide an exceptional spinnerbait lure that is simple in structure, inexpensive to manufacture, and highly effective at attracting fish.

SUMMARY OF THE INVENTION

This invention is for an improvement to a spinnerbait lure of the type having a frame with at least one arm and having a blade secured to that frame. The term "spinnerbait lure" includes in-line spinner lures, V-shaped or safety-pin spinner lures, and buzzbait lures. The term "frame" as used herein means an elongate member having a predetermined shape in its non-stressed condition such that its ends and angled vertices between the ends are in substantially fixed positions with respect to one another. A frame is known to those skilled in the fishing art as a structure that is used to support and retain such elements as a jig, hook, blade, or skirt and that does not lose its shape when not being stressed.

The improvement comprises forming the frame from a integral length of polymeric material. The ability to provide a frame made from polymeric material that can be used in spinnerbait lures represents a clearly advantageous and novel advance to the art. It is most preferred that the selection of polymeric material and the dimensions of the frame be such that the frame exhibits flexing resilience wherein the frame has the ability to recover its original configuration after undergoing non-destructive force-induced flexing when used for fishing.

In a highly preferred embodiment of this invention, the frame has upper and lower arms extending divergently from a frame-vertex. In this embodiment, a fishing line or a fishing leader can be attached with respect to the frame at a point substantially adjacent to the frame-vertex. It is most preferred that the upper arm be substantially coplanar with the lower arm.

A highly preferred form of this embodiment finds at least the upper arm having an oblong cross-section. The term "oblong" as used herein refers to an cross-section having a figure or shape that is elongated in one of its dimensions. It is most preferred that this cross-section have an area that progressively decreases as you advance from the frame vertex toward the distal-end of the upper arm. It is more preferred that the greater dimension of the oblong cross-section be the one that lies in the plane of the frame. Any of these configurations provides the frame with preferential vibratory qualities when pulled through the water so as to increase the overall attractiveness of the lure to fish. In particular, the oblong cross-section imparts to the upper arm a preferential directionality to its vibrations.

A certain desirable example of this particular embodiment has the frame-vertex defining a line-aperture. The line-aperture is where the fishing line/leader can be attached with respect to the frame. More preferred is where the frame is curved at the frame-vertex. It is also preferred that the upper arm have an upper aperture with which the blade is attached to the frame.

Most desirable is where the lure includes a jig and the jig is attached to the lower arm of the frame at its distal-end. A more highly preferred example finds the jig having a jig-head and a hook, the jig-head being embedded within the lower distal-end. Most preferred is where the jig-head is embedded in a manner where the lower arm is substantially tapered adjacent to its proximal-end. This tapering can be substantially gradual or it can occur in a step-down fashion. Tapering allows stresses placed on the lower arm at the distal-end to be diffused throughout the lower arm. Without tapering, these stresses are focused at the point immediately adjacent to the jig due to the abrupt change there in the cross-section of the arm.

A most preferred embodiment of this invention is where the polymeric material forming the frame is transparent. More preferred finds the polymeric material to have color. A highly preferred example of this embodiment has the material being comprised of polycarbonate.

In this form of the invention, it is most desirable where the lure includes a jig and the frame has two coplanar arms, the jig-head being embedded within the lower arm. More desirable is where the jig-head is embedded in the distal-end of the lower arm and the arm is substantially tapered from the proximal-end of the jig-head toward the frame-vertex.

Another highly preferred embodiment is where the lure includes a frame formed from polycarbonate that can either be clear or colored. Most preferred is a certain example of the invention where the frame is formed in a molding process.

One very desirable embodiment finds the frame to have at least one arm and the arm having a distal-end in which the jig-head of a jig is embedded. More desirable is where the arm is substantially tapered adjacent to the jig-head. Most desirable is where the frame has two arms made from transparent polycarbonate and the blade attaches to the upper arm and the jig-head is enclosed within the lower arm.

DETAILED DESCRIPTION OF PREFERRED EMBODIMENTS

Figure 1:
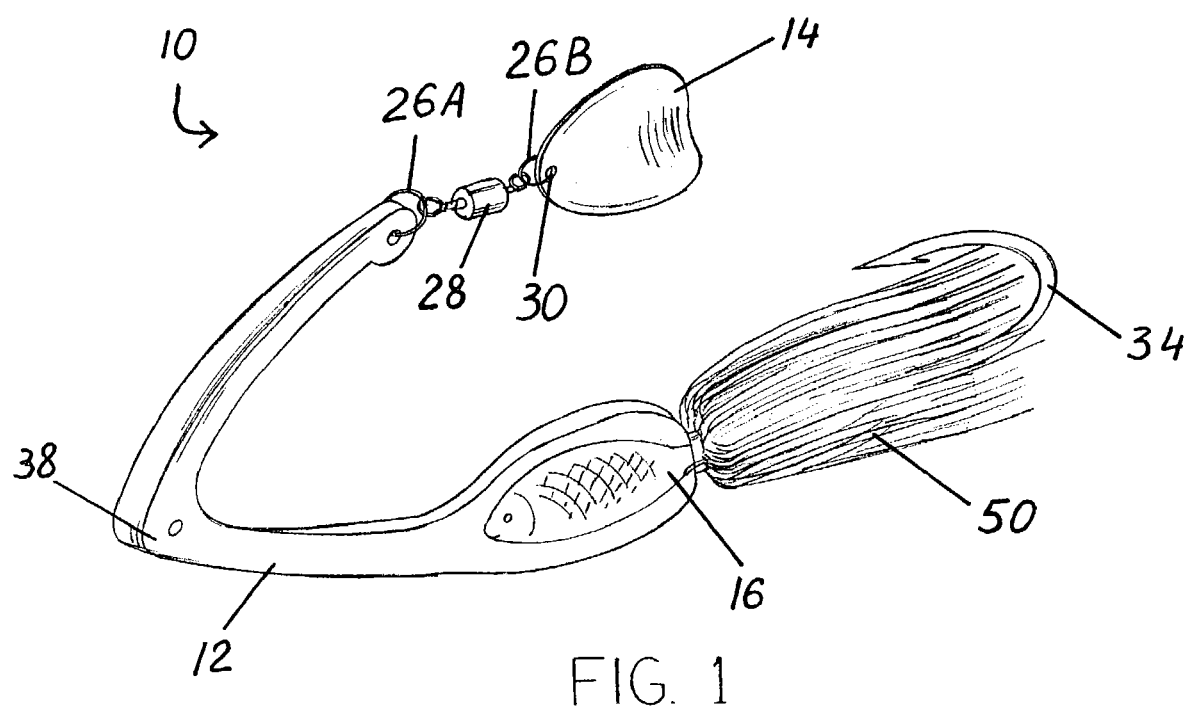
FIG. 1 is a perspective view of a preferred spinnerbait lure in accordance with this invention.
Figure 2:
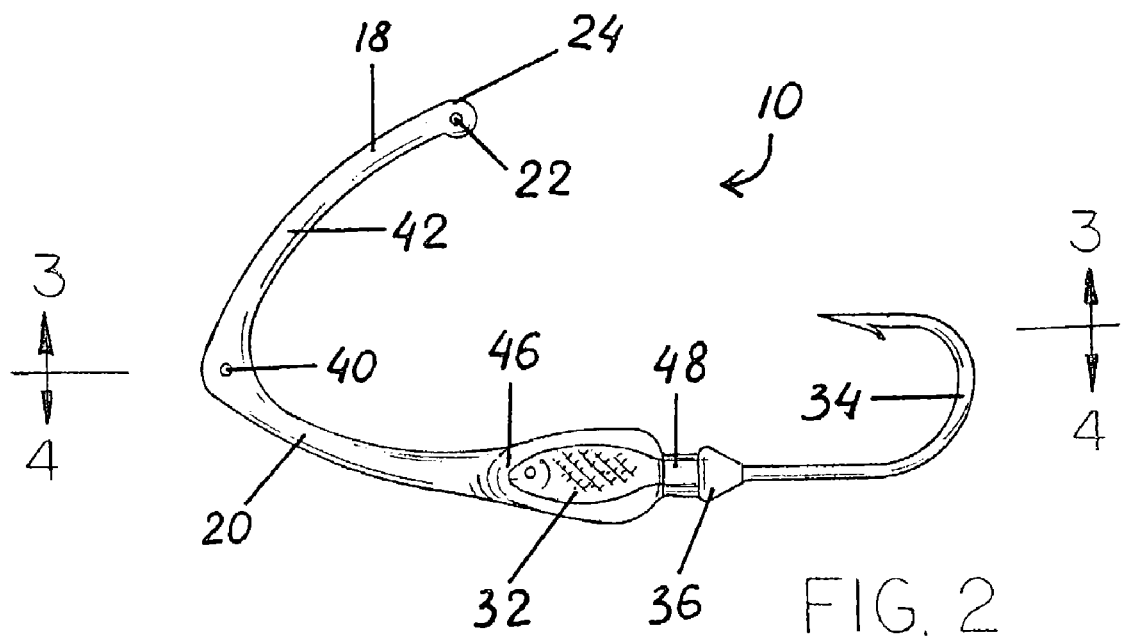
FIG. 2 is a top view of the frame and enclosed jig of the lure in FIG. 1.

The drawings illustrate an improved spinnerbait lure 10 in accordance with this invention. As illustrated in FIGS. 1 and 2, lure 10 is comprised of frame 12, blade 14, and jig 16. Frame 12 has upper arm 18 and lower arm 20. Upper arm 18 forms upper aperture 22 at upper distal-end 24.

Blade 14 is secured to frame 12 by inserting split ring 26A through upper aperture 22 and one end of swivel 28. Split ring 26B is inserted through blade-aperture 30 and the opposite end of swivel 28 to connect swivel 28 to blade 14. It can be appreciated that blade 14 can be attached to frame 12 by means of upper aperture 22 in a number of other ways including use of a single split ring or use of snaps in place of split rings.

FIGS. 1 and 2 show that jig 16 is comprised of jig-head 32 and hook 34. Jig-head 32 is a body typically made from lead in a shape and with markings that are intended to replicate a small fish such as a minnow as illustrated.

Frame 12 is formed from polycarbonate using a molding process wherein jig 16 becomes embedded within lower distal end 36 of lower arm 20. Magnets are inserted into the mold above and below jig 16 to suspend jig 16 within the mold whereby liquid polycarbonate can substantially surround it.

A commercially available form of polycarbonate meeting the requirements of this invention is LEXAN® produced by General Electric. Polycarbonate forms a transparent structure to which color may be added in a manner familiar to those skilled in the art. Polycarbonate also has desirable tensile strength, toughness and elasticity. Alternative but less preferable polymeric materials having these properties include liquid crystal polymers, polyacetals, and polyacrylics such as polymethylmethacrylate otherwise known as PMMA.

As a consequence, frame 12 can be made so that it is clear when placed in the water or it can be given a hue so that it blends better into its surroundings. Either way, frame 12 does not serve as a distraction to the fish attracted to lure 10. Moreover, frame 12 has durability that allows it to resist kinking or breakage during a fish strike. This prevents damage from occurring to lure 10 that would diminish its usefulness or that could cause jig 16 to become separated from frame 12. Frame 12 also demonstrates resilience that enables it to return to its original shape when non-destructively flexed.

As illustrated in FIGS. 1 and 2, frame 12 includes frame-vertex 38 where upper arm 18 integrally curves into lower arm 20. Frame-vertex 38 is provided with line-aperture 40. Line-aperture 40 is sized for a fishing line or fishing leader to be directly tied to frame 12 or for connecting the fishing line/leader to frame 12 by means of a snap-swivel or split ring-swivel combination. The latter approach is often preferable so as to avoid the line or leader from becoming twisted and thereby affecting the fish attracting motions of lure 10.

Figure 3:
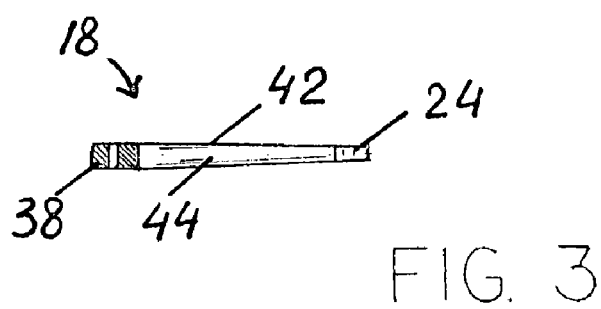
FIG. 3 is a side view of the upper arm of the frame along section line 3—3 in FIG. 2.

Upper arm 18 has top surface 42 and side edge 44. FIGS. 2 and 3 show that top surface 42 is wider than the height of side edge 44, thereby giving upper arm 18 an oblong cross-section. Furthermore, as seen in FIG. 3, side edge 44 narrows in height when moving along upper arm 18 from frame-vertex 38 toward upper distal end 24. The resulting oblong or "flattened" configuration for upper arm 18 gives upper arm 18 preferential directionality in its vibratory characteristics when lure 10 is pulled through the water. In particular, the cross-section imparts to upper arm 18 a vibratory pattern orthogonal to top surface 42. It is believed that such characteristics not only enhance the overall sound generated by lure 10 but also give frame 12 added action in the water that compliment the fish attracting rotation of blade 14.

Figure 4:
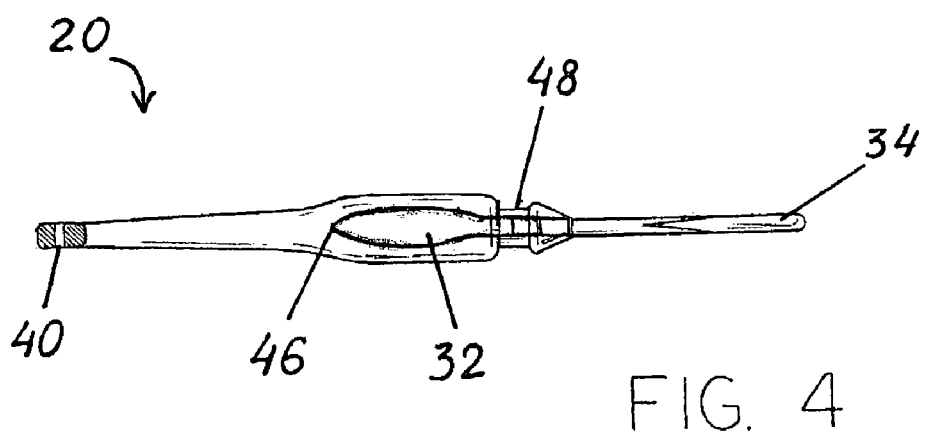
FIG. 4 is a side view of the lower arm of the frame and jig along section line 4—4 in FIG. 2.

As illustrated in FIGS. 1, 2 and 4, jig-head 32 is encapsulated at lower distal end 36 of lower arm 20 to firmly secure jig 16 to frame 12. Lower arm 20 terminates at a point adjacent to the junction between jig-head 32 and hook 34. Lower arm 20 is formed so that it substantially tapers downward from a point beginning at the proximal-end 46 of jig-head 32 toward the direction of frame-vertex 38.

Lower arm 20 is also constructed to form jig-collar 48 at the distal end of jig-head 32. Skirt 50 is attached to lower arm 20 at jig-collar 48. Skirt 50 is another fish-attracting element of lure 10 commonly constructed from plastic or rubber strands so as to distract the fish from hook 34. In typically dressing jig 16 with skirt 50, either skirt 50 is tied to frame 12 at jig-collar 48 or skirt 50 is provided with an elastic loop that slips over jig-collar 48.

Lure 10 can be constructed in varying sizes and shapes in accordance with this invention for the purpose of catching different species of fish in a variety of fishing environments.

While the principles of the invention have been shown and described in connection with specific embodiments, it is to be understood that such embodiments are by way of example and are not limiting.

The invention claimed is:

1. In a spinnerbait lure of the type having a frame, the frame having upper and lower arms extending divergently from a frame-vertex in a predetermined shape in a non-stressed condition, the shape having the arms in a substantially fixed configuration with one another, with at least one blade and a jig secured to the frame, the improvement wherein:

the frame is formed in a molding process from transparent polymeric material into an integral length, the polymeric material being selected such that the frame always retains the original configuration absent force-induced flexing sufficient to break the frame, the frame is curved at the frame-vertex and is adapted to attach with respect to a fishing line/leader substantially adjacent to the frame-vertex, the upper arm is substantially coplanar with the lower arm and defines an upper aperture to attach the blade with respect to the frame, and the lower arm has a lower distal-end and the jig has a jig-head and a hook, the jig-head being irremovably embedded within the lower distal-end by molding the polymeric material therearound.

2. The lure of claim 1 wherein the frame is dimensioned to exhibit durability and vibratory action during fishing.

3. The lure of claim 1 wherein at least the upper arm has an oblong cross-section, thereby imparting a preferential directionality to vibration of the upper arm.

4. The lure of claim 3 wherein the upper arm has an upper distal-end and the cross-section of the upper arm has an area that progressively decreases from the frame-vertex toward the upper distal-end.

5. The lure of claim 4 wherein the cross-section of the upper arm has two dimensions, the greater dimension being in the plane of the frame.

6. The lure of claim 3 wherein the frame-vertex defines a line-aperture, whereby a fishing line/leader is attachable with respect to the frame at the line-aperture.

7. The lure of claim 1 wherein the jig-head has a jig proximal-end and the lower arm is substantially tapered adjacent to the jig proximal-end, whereby stresses upon the arm from deflection at the distal-end are diffused throughout the lower arm.

8. The lure of claim 1 wherein the polymeric material has color.

9. The lure of claim 8 wherein the polymeric material comprises polycarbonate.

\* \* \* \* \*